United States Patent
Ramon Moreno et al.

(10) Patent No.: US 9,090,509 B2
(45) Date of Patent: Jul. 28, 2015

(54) PANEL OR SLAB FORMED BY STONE AGGLOMERATE CONTAINING AN ORGANIC BINDER OF A PLANT ORIGIN

(75) Inventors: Jose Luis Ramon Moreno, Cantoria (ES); Salvador Cristobal Rodriguez Garcia, Cantoria (ES); Eladio Pinero Gonzalez, Cantoria (ES); Lorena Solar Moya, Cantoria (ES); Adrian Medina Jimenez, Cantoria (ES)

(73) Assignee: CONSENTINO, S.A., Cantoria (ES)

( * ) Notice: Subject to any disclaimer, the term of this patent is extended or adjusted under 35 U.S.C. 154(b) by 226 days.

(21) Appl. No.: 13/257,245

(22) PCT Filed: Mar. 18, 2009

(86) PCT No.: PCT/ES2009/000153
§ 371 (c)(1),
(2), (4) Date: Nov. 9, 2011

(87) PCT Pub. No.: WO2010/106196
PCT Pub. Date: Sep. 23, 2010

(65) Prior Publication Data
US 2012/0115983 A1    May 10, 2012

(51) Int. Cl.
*C04B 26/18* (2006.01)
*C04B 18/16* (2006.01)
*C04B 111/00* (2006.01)
*C04B 111/60* (2006.01)

(52) U.S. Cl.
CPC ....... *C04B 26/18* (2013.01); *C04B 2111/00017* (2013.01); *C04B 2111/60* (2013.01); *Y02W 30/95* (2015.05)

(58) Field of Classification Search
CPC .............................. C04B 26/18; C04B 18/167
USPC .................................................. 524/599, 604
See application file for complete search history.

(56) References Cited

U.S. PATENT DOCUMENTS

| | | | |
|---|---|---|---|
| 3,278,662 A * | 10/1966 | Mangrum | 264/77 |
| 3,296,202 A | 1/1967 | Schmitz-Josten et al. | |
| 4,371,639 A * | 2/1983 | Muszynski | 523/512 |
| 4,698,010 A | 10/1987 | Toncelli | |
| 5,244,941 A * | 9/1993 | Bruckbauer et al. | 523/171 |
| 5,281,633 A * | 1/1994 | Okuno et al. | 523/513 |
| 5,314,554 A * | 5/1994 | Owens | 156/154 |
| 5,314,729 A * | 5/1994 | Ikezoe et al. | 428/15 |
| 5,321,055 A * | 6/1994 | Slocum | 523/171 |
| 5,324,757 A * | 6/1994 | Ohkawa et al. | 523/514 |
| 5,356,953 A * | 10/1994 | Harada et al. | 523/171 |
| 5,364,672 A * | 11/1994 | Schultze-Kraft | 428/15 |
| 5,780,530 A * | 7/1998 | Mizutani et al. | 523/209 |
| 5,783,635 A * | 7/1998 | Akiyama et al. | 525/168 |
| 5,965,672 A * | 10/1999 | Agari et al. | 525/446 |
| 6,028,127 A * | 2/2000 | Yanagase et al. | 523/171 |
| 6,174,954 B1 * | 1/2001 | Amekawa | 524/533 |
| 6,221,935 B1 * | 4/2001 | Hashimoto et al. | 523/526 |
| 6,222,005 B1 | 4/2001 | Loza et al. | |
| 6,268,464 B1 * | 7/2001 | Keinanen et al. | 528/272 |
| 7,815,827 B2 * | 10/2010 | Cruz | 264/77 |
| 2001/0043996 A1 * | 11/2001 | Yamada et al. | 428/34.4 |
| 2001/0051674 A1 * | 12/2001 | Renzi et al. | 523/171 |
| 2002/0086122 A1 * | 7/2002 | Sakai | 428/15 |
| 2003/0050380 A1 * | 3/2003 | Risley | 524/445 |
| 2003/0083420 A1 * | 5/2003 | Yoshimoto et al. | 524/494 |
| 2006/0051598 A1 | 3/2006 | Dalla Valle | |
| 2006/0119002 A1 * | 6/2006 | Toncelli | 264/316 |
| 2006/0270758 A1 * | 11/2006 | Ong et al. | 523/171 |
| 2007/0032608 A1 * | 2/2007 | McAlvin et al. | 525/445 |
| 2007/0244222 A1 * | 10/2007 | Ghahary et al. | 523/171 |
| 2007/0281114 A1 * | 12/2007 | Rha et al. | 428/15 |
| 2008/0315448 A1 | 12/2008 | Cruz | |
| 2009/0062413 A1 * | 3/2009 | Adur et al. | 521/157 |
| 2009/0062431 A1 | 3/2009 | Nasr et al. | |
| 2009/0312485 A1 * | 12/2009 | Page et al. | 524/539 |
| 2010/0048772 A1 * | 2/2010 | Moore et al. | 524/88 |
| 2010/0113645 A1 * | 5/2010 | Oh et al. | 523/171 |
| 2010/0154676 A1 * | 6/2010 | Park et al. | 106/286.5 |
| 2012/0183735 A1 * | 7/2012 | Moreno et al. | 428/156 |

FOREIGN PATENT DOCUMENTS

| | | |
|---|---|---|
| DE | 196 27 165 A1 | 1/1997 |
| EP | 2 011 632 A2 | 1/2009 |
| ES | 2 166 947 T3 | 5/2002 |
| ES | 2 187 313 A1 | 6/2003 |
| ES | 2 249 163 A1 | 5/2006 |
| KR | 2002-0051443 A | 6/2002 |
| KR | 777801 B1 * | 11/2007 |
| WO | 89/11457 A1 | 11/1989 |
| WO | 99/23045 A1 | 5/1999 |
| WO | 00/44686 A1 | 8/2000 |

(Continued)

OTHER PUBLICATIONS

Machine translation of KR 777801, 2013.*

*Primary Examiner* — Liam J Heincer
(74) *Attorney, Agent, or Firm* — Sughrue Mion, PLLC

(57) ABSTRACT

The present invention relates to panels or slabs formed by stone agglomerate for the manufacture of which an organic binder containing an ingredient of a plant origin is used. The panels or slabs object of the invention are formed from stone materials or the like, granulated and subsequently agglomerated by means of a binder, specifically an organic resin containing one or more polyols of a plant origin.

Furthermore, by means of using this binder together with materials from waste and used and/or recycled products, a material with good features and with a very high content of recycled material or material of a renewable origin can be obtained.

The manufactured panel or slab containing a resin part of a plant origin of the present invention is particularly suitable for its use indoors as a kitchen counter, a bathroom counter, or any work surface, as well as for its use as flooring or sidings.

9 Claims, No Drawings

(56) References Cited

FOREIGN PATENT DOCUMENTS

| WO | 2005/012203 | A2 | 2/2005 |
| WO | 2005/014256 | A1 | 2/2005 |
| WO | 2005/111126 | A1 | 11/2005 |
| WO | 2006/134179 | A2 | 12/2006 |
| WO | 2007/138529 | A2 | 12/2007 |

* cited by examiner

PANEL OR SLAB FORMED BY STONE AGGLOMERATE CONTAINING AN ORGANIC BINDER OF A PLANT ORIGIN

CROSS REFERENCE TO RELATED APPLICATIONS

This application is a National Stage of International Application No. PCT/ES2009/000153 filed Mar. 18, 2009, the contents of all of which are incorporated herein by reference in their entirety.

TECHNICAL FIELD OF THE INVENTION

The present invention relates to panels or slabs formed by stone agglomerate for the manufacture of which an organic binder containing an ingredient of a plant origin is used. The panels or slabs, object of the invention, are formed from stone materials or the like, granulated and subsequently agglomerated by means of a binder, specifically an organic resin containing one or more polyols of a plant origin.

Furthermore, by means of using this binder together with materials from waste and used and/or recycled products, a material with good features and with a very high content of recycled material or material of a renewable origin can be obtained.

The manufactured panel or slab containing a resin part of a plant origin of the present invention is particularly suitable for its use indoors as a kitchen counter, a bathroom counter, or any work surface, as well as for its use as flooring or sidings.

BACKGROUND OF THE INVENTION

The process of manufacturing stone blocks, commercially known as Brentonstone, described in document U.S. Pat. No. 4,698,010, is well known. By means of said process, a mass of inorganic fillers of a known particle size, pigments or dyes, an organic binder and additives is formed, in amounts suitable to make the formation of said material possible by means of the simultaneous action of vacuum compression and vibration.

There are currently several patent documents, such as for example, US 2006/0162618 A1, ES 2166947 T3, WO 2005/111126 A1, WO 99/23045 A1, which describe processes for obtaining slabs from stone materials, generally granulated materials which are agglomerated in most cases by means of a binder that is usually a polyester, epoxy or acrylic type thermoset organic resin and, in any case, a petrochemical polymer, with an amount of synthetic diluents such as styrene, toluene, xylene, etc., and other additives, as the case may be.

Document ES 2187313 A1, by the authors of the present application, describes a method for manufacturing artificial stone slabs that can be applied to decoration from a mixture of ground materials with different particle sizes of silicas, glasses, granites, ferro-silicon quartz, marble or other similar materials and 7% to 14% by weight of polyester resin, as well as other additives, such as a dye for example, as well as a catalyst, a coupling agent and accelerant which act on the resin. Also by the same authors, document WO 2005/014256 A1 describes a material with appearance of natural stone formed from a mixture of natural stone materials and 6% to 30% by weight of polyester resin, to which an antimicrobial material is added to prevent the proliferation of bacteria or microbes on the surface, the obtained material being suitable for domestic use, specifically in bathroom and kitchen counters. Likewise, in document WO 2006/134179 A2, slabs of artificial stone and polymerizable resin (4% to 15% polyester) having a veined effect are obtained by using the vacuum vibro-compression technique like in the two documents mentioned above.

Document EP 2011632 A2, also by the authors of the present application, describes a process for manufacturing slabs with mixtures similar to those described in the previous documents and 5% to 15% polyester resin, characterized in that the curing process for obtaining the hardening of said resin is carried out by means of microwave irradiation and calcium carbonate or sulfate are added to the resin as catalysts to facilitate said process.

In recent years, the consumption of stone agglomerates for their use as kitchen counters, bathroom counters or as a work surface in general, and also for their use as flooring or wall cladding, has considerably increased, being a very common product so the production level and, therefore, the consumption of resin, have greatly increased.

As a result, an important part of research in this field has been dedicated to searching for components which come from renewable and/or recycled raw materials that are more environmentally friendly and make the overall process cleaner and more efficient, and at the same time allow manufacturing a material with excellent mechanical and aesthetic features.

Thus, raw materials from stone waste from construction, recycled glass, industrial waste, etc., are described in various patent documents, such as for example document KR 20020051443, which describes the manufacture of construction materials, such as bricks, blocks, tiles, etc, using limestone and waste materials generally from construction. Document ES 2249163 A1 describes a system of using disposable alabaster waste, using said waste in a container where a settling process is carried out by vibrating said waste, and the polyester resin is subsequently poured in, with which the combination is mixed under vacuum. The resin used is preferably polyester resin mixed with alabaster or dolomite powder.

Other documents using waste materials are, for example, WO 00/44686 A1 which uses waste glass for manufacturing artificial stone, and ES 2121529 A1 which uses ground recycled glass for manufacturing cement agglomerates. Document WO 89/11457 A1 also uses a synthetic resin with a mixture of recycled glass and new glass, among other materials, to obtain artificial stone with a natural appearance.

Document US 2006/0051598 A1 describes a slab or block manufactured from an agglomerate material comprising fragments, in the form of powder, grit or the like, and pure silicon tablets previously used in the electronic industry as wafer supporting microchips and silicon tablets of printed circuits, mixing all the components with an agglutinating agent and a dye for obtaining the desired product.

There are also documents in the state of the art which describe the use of resins that are less aggressive with the environment, or in which the reactive solvent which usually contains said resin is removed. As in the case of patent application WO 2007/138529 A2, which describes the manufacture of a stone agglomerate from the use of a polyester resin free of reactive diluents (without styrene) and formed by the reaction between an epoxidized triglyceride and at least one carboxylic anhydride and in which the necessary triglycerides can be obtained starting from vegetable or animal fats. With this method, which is already known in other sectors as shown in documents U.S. Pat. No. 3,296,202 and DE19627165, a resin is obtained which is not a polyester resin per se, but rather a partially epoxidized system. Despite the fact that the physico-mechancial properties of these resins are very satisfactory, the main problem with their use is that it would be necessary to have the process infrastructure suitable epoxidizing the fatty acids and, with it, obtaining the resin. Furthermore, the catalytic system needed for polymerizing this resin is completely different from the systems which are used today, which would make it necessary to make substantial mechanical changes in the already implemented processes, with the economic investment this involves, and eliminating the possibility of being able to reuse current systems.

Instead of removing the styrene which is used with the resin, another possibility would be to obtain said resin from elements of a plant origin. Thus, document U.S. Pat. No. 6,222,005 B1 describes a process for preparing a polyester resin by means of two steps: a) reacting a carboxylic acid, containing at least two carboxyl groups, or its corresponding anhydride containing one ethylenic unsaturation with a saturated, monohydric alcohol having a boiling point of less than 150° C., in an amount sufficient to obtain the half ester, and b) reacting the half ester obtained in (a) with a polyol in the presence of an oil containing one unsaturation or the corresponding fatty acid, which can be present by up to 45%. Said oil is selected from the group of castor, peanut, olive, cottonseed, soybean or rape seed oil. The use of said unsaturated oils allows reducing the use of petroleum byproducts. The resin thus obtained is used in the manufacture of composites for agricultural, marine and transport equipment.

Therefore, there is still a need to develop polyester resins derived from petroleum byproducts, with optimal properties for manufacturing quartz agglomerates in which the glycols of a petrochemical origin are partially substituted with glycols obtained from a plant origin, the catalytic system of which is the one typically used and does not require mechanical changes in the process and obtains a quartz agglomerate with features similar to or better than those traditionally obtained.

Thus, the present invention describes a panel or slab formed from a polyester resin which has been partially replaced with polyols of a plant origin, such as from corn, for example. Furthermore, it has surprisingly been found that said resin containing polyols of a plant origin is perfectly suitable for the process of manufacturing said panel or slab, partially or entirely substituting the conventional inorganic aggregates with others from different industrial processes or other uses, such as ground glass from recycled bottles, flat glass from the glass manufacturing industry, porcelain material from waste processes in processes for manufacturing porcelain, etc. Thus, a panel or slab with resin of a plant origin, and furthermore with a high raw material content of renewable and/or recycled raw materials, and which is therefore environmentally friendly, is obtained.

Object of the Invention

An object of the present invention relates to a method for manufacturing artificial stone panels or slabs particularly suitable for their use indoors, comprising a phase of grinding the different materials of varied particle size forming the filler, another phase containing the agglutinating agent with the catalyst and optionally other additives, mixing said phases until homogenizing the materials with the agglutinating agent, a phase of molding and compacting pulp obtained by vacuum vibro-compression, and a phase of hardening by polymerization of the agglutinating agent by means of heating, ending with a phase of cooling and polishing, characterized in that said agglutinating agent is made up of a polyester resin in which 12-30% of the polyol has been substituted with a polyol of a plant origin.

In a particular embodiment, the agglutinating agent used during the method constituting the first object of the invention is present between 5% and 18% of the agglomerate.

Preferably, the agglutinating agent used is a polyester resin with 12-30% of a polyol of a plant origin, the polyol preferably being of a plant origin from corn. In a particular embodiment said polyol is selected from one or more of the group consisting of ethylene glycol, 1,2-propanediol, 1,3-propanediol, 1,4-butanediol, 2,2-dimethyl-1,3-propanediol, diethylene glycol, dipropylene glycol, polyoxyethylene glycol and polyoxypropylene glycol. More preferably, the polyol used is 1,2-propanediol and/or the 1,3-propanediol.

In another particular embodiment, the method for manufacturing artificial stone panels or slabs is characterized in that the materials forming part of the composition can be, among others, marble, dolomite, opaque quartz, crystalline quartz, silica, glass, mirror, cristobalite, granite, feldspar, basalt, ferro-silicon, etc.

In another particular embodiment, the method of the object of the invention is characterized in that the materials forming part of the composition can be of variable particle size and partially or entirely come from recycling or residual waste.

In another particular embodiment, the method of the object of the invention is characterized in that at least one of the materials forming part of the filler has been substituted by approximately 40%-90% with a similar waste or recycled material. Preferably at least one of the materials forming part of the filler is substituted by 50% with a similar waste or recycled material. More preferably, at least one of the materials forming part of the filler has been substituted by 90% with a similar waste or recycled material.

Thus, the object of invention relates to a panel or slab particularly suitable for its use indoors, manufactured according to the method described above, in which the agglutinating agent is made up of 5% to 18% of polyester resin in which 12-30% of polyol has been substituted with a polyol of a plant origin, which can furthermore contained recycled material.

DESCRIPTION OF THE INVENTION

The present invention consists of obtaining stone agglomerates in the form of a panel or slab using a polyester resin, during the manufacture of which the traditionally used polyol of a petrochemical origin has been partially substituted with a polyol obtained from the fermentation of plant matter, such as from corn, for example.

If a general process for manufacturing panels or slabs with a high percentage of polyester resin of a petrochemical origin, for example, 35%, by the present invention is considered, up to 12-30% of said resin can be substituted with polyol of a plant origin.

Any polyol of a plant origin would be suitable, the preferred one being from corn. The preferred polyols in the present invention are ethylene glycol, 1,2-propanediol, 1,3-propanediol, 1,4-butanediol, 2,2-dimethyl-1,3-propanediol, diethylene glycol, dipropylene glycol, polyoxyethylene glycol and polyoxypropylene glycol; and more preferably the polyol of a renewable origin would be 1,2-propanediol and/or 1,3-propanediol.

The main physicochemical parameters of the resin thus obtained are illustrated in the following table:

| | |
|---|---|
| Viscosity 25° C. (cps) | 290-600 |
| Density 25° C. (g/cm$^3$) | 1.00-1.18 |
| Barcol Hardness (of the polymerized resin) | 45-60 |

The method followed for manufacturing the quartz agglomerate is the traditional one for this type of material, according to which a mixture of aggregates of a known particle size is mixed with a resin acting as a binder to form the manufacturing mass. Furthermore, additives such as dyes and pigments, antimicrobial additives, coupling agents, ultraviolet filters and accelerants and catalysts for the polymerization can be added to said mass.

Preferred Embodiment of the Invention

In the case of the present invention, the resin used is an unsaturated polyester resin containing between 12% and 30% of a polyol obtained from plant matter. Preferred polyols would be 1,2-propanediol and 1,3-propanediol.

As conventional aggregates and, by way of example, marble, dolomite, opaque quartz, crystalline quartz, silica, glass, mirror, cristobalite, granite, feldspar, basalt, ferro-silicon, etc., can be mentioned.

Furthermore, it has been seen that it is possible to obtain an agglomerate with a high content of recycled material using this resin, if materials such as recycled glass (from glass recycled by the end consumer as well as from waste from industrial processes), ground mirror from post-industrial waste, manufacturing waste from the ceramic industry and/or aluminum silicate from vitrified ash, are introduced. By combining the raw materials traditionally used in the manufacture of a conventional stone agglomerate with them, a material with a high content of environmentally friendly recycled material is obtained, as has already been mentioned.

The preferred percentages for the mixture of the agglomerate of the present invention, as has been experimentally confirmed, are the following (% by weight):
  Recycled glass: 35-90%.
  Ground mirror from waste: 10-90%.
  Waste of the ceramic industry: 10-30%.
  Aluminum silicate from vitrified ash: 6-35%.
  And the resin content of the agglomerate will be between 5% and 18%, more preferably between 7% and 13%.

Depending on the particular ingredient and on its percentage in the formulation, it will be convenient to substitute all or only part of the amount of the new material with waste or recycled material, according to the aforementioned percentages. In the event that only a percentage is substituted and one and the same ingredient, new and waste ingredient, is used, both of them, already in the desired form, in pellets, powder, etc., according to the characteristics of the end product to be obtained, are previously mixed, being subsequently mixed with the rest of the ingredients.

According to the present invention, the agglutinating material for obtaining the stone conglomerate is a mixture of synthetic resin, specifically a polyester resin containing polyol of a petrochemical origin together with a polyol of a plant origin, preferably from corn, which are previously mixed, and once mixed the usual additives are added for both the polymerization step and for the end product. Said additives preferably are an accelerant, a catalyst, a coupling agent, and one or more pigments or dyes in solid or liquid state. An antimicrobial agent, such as Triclosan, for example, can also be added as an additive.

The invention is illustrated below by means of non-limiting examples of the invention.

EXAMPLES

Four examples of preparations of agglomerates have been formulated, using to that end different ingredients and percentages thereof.

Examples 1 and 2

In Examples 1 and 2, one and the same material with conventionally used aggregates has been formulated, substituting the currently used resin (35% of polyols of a petrochemical origin) with a resin containing 22% of polyols of a plant origin and 11% of polyols of a petrochemical origin which are illustrated in the following table:

| Ingredients * | Example 1 | Example 2 |
|---|---|---|
| Micronized quartz (%) | 26 | 26 |
| 0.1-0.6 mm mirror (%) | 15 | 15 |
| 0.6-1.2 mm mirror (%) | 15 | 15 |
| 0.6-1.2 ground silica (%) | 34.5 | 34.5 |
| Resin of a petrochemical origin | 9.5 | |
| 22% plant polyol resin | | 9.5 |

* A catalyst, an accelerant, silane and dye in solution have been added as additives.

The mechanical features of the material, according to the UNE EN-14617-2 standard, for determining the bending strength of stone agglomerates, are the following:

| Property | Example 1 | Example 2 |
|---|---|---|
| Bending modulus (MPa) | 13720-14396 | 12991-14241 |
| Bending strength (MPa) | 43.5-53.1 | 51.2-56.4 |
| Maximum load withstood (N) | 6206-7644 | 7404-8104 |

It is inferred from the results that the suitable adjustment of the plant polyol content can, surprisingly, even improve to a certain extent the results obtained with the traditionally used resin.

Examples 3 and 4

In the Examples 3 and 4, different proportions of new and recycled materials have been used, in addition to the resin with a different polyol. The new and recycled material have been previously mixed individually before being added to the mixture.

| Ingredients * | Example 3 | Example 4 |
|---|---|---|
| Micronized quartz (%) | 25 | 10 |
| Micronized recycled glass material (%) | — | 15 |
| 0.1-0.6 mm new glass (%) | 15 | 5 |
| 0.1-0.6 mm recycled glass (%) | — | 10 |
| 0.6-1.2 mm new glass (%) | 16.5 | 5 |
| 0.6-1.2 mm recycled glass (%) | — | 11.5 |
| 0.1-0.4 mm ground silica (%) | 7.5 | — |
| 0.1-0.4 aluminum silicate from vitrified ash (%) | — | 7.5 |
| 0.6-1.2 new mirror (%) | 10 | — |
| 0.6-1.2 recycled mirror (%) | — | 10 |
| 2.5-4.5 ground quartz (%) | 17.5 | 17.5 |
| Resin of a petrochemical origin | 8.5 | — |
| 22% plant polyol resin | — | 8.5 |

* A catalyst, an accelerant, silane and dye in solution have been added as additives.

The mechanical characteristics of the agglomerate slabs obtained are shown in the following table:

| The mechanical characteristics of the agglomerate slabs obtained are shown in the following table: | | | | |
|---|---|---|---|---|
| Test | Standard | Unit | Reference* | Result** |
| Determination of the bending strength | UNE EN 14617-2 | MPa | 29-70 | 35-62 |
| Determination of the abrasion resistance | UNE EN 14617-4 | Mm | 22-33 | 23-33 |
| Determination of the impact strength | UNE EN 14617-9 | Cm | 25-97 | 32-81 |

-continued

The mechanical characteristics of the agglomerate slabs obtained are shown in the following table:

| Test | Standard | Unit | Reference* | Result** |
|---|---|---|---|---|
| Determination of the compression strength | UNE EN 14617-15 | MPa | 112-248 | 110-200 |
| Determination of the apparent mass and absorption coefficient | UNE EN 14617-1 | Kg/cm$^3$ % | 2.25-2.45 0.04-0.14 | 2.25-2.45 0.04-0.14 |
| Determination of the freeze-thaw resistance | UNE EN 14617-5 | KMf25 | 0.90-1.20 | 0.97-1.18 |

*A mean obtained with different slabs of quartz agglomerate containing the polyester resin of a petrochemical origin as a agglomerating agent has been used as a reference.
**The results of this column are the mean of the measurements taken with slabs of the formulations according to Examples 2 and 4.

The invention claimed is:

1. An artificial stone panel or slab made of stone agglomerate particularly suitable for its use indoors, said agglomerate comprising an agglutinating agent and a filler,
    wherein the agglutinating agent is a polyester resin in which 12-30% by weight of the polyol in said resin is a polyol of plant origin;
    the agglomerate comprises 5% to 18% by weight of the agglutinating agent with respect to the total weight of the agglomerate; and
    the filler comprises a plurality of materials, the materials including new glass, recycled glass, new mirror, ground mirror from post-industrial waste, waste from the ceramic industry and aluminum silicate from vitrified ash mirror from post-industrial waste.

2. The artificial stone panel or slab according to claim 1, wherein the polyols of plant origin are selected from the group consisting of: ethylene glycol, 1,2-propanediol, 1,3-propanediol, 1,4-butanediol, 2,2-dimethyl-1,3-propanediol, diethylene glycol, dipropylene glycol, polyoxyethylene glycol and polyoxypropylene glycol.

3. The artificial stone panel or slab according to claim 1, wherein the polyols of plant origin are 1,2-propanediol and/or 1,3-propanediol.

4. The artificial stone panel or slab according to claim 1, wherein the polyol of plant origin is obtained from corn.

5. The artificial stone panel or slab according to claim 1, wherein the polyester resin has a viscosity of 290-600 cps at 25° C., a density of 1.00-1.18 g/cm$^3$ at 25° C. and a hardness of 45-60 measured by the Barcol hardness test.

6. The artificial stone panel or slab according to claim 1, wherein, with respect to the total weight of the agglomerate, the recycled glass is present in an amount of 35-90% by weight, the ground mirror is present in an amount of 10-90% by weight, the waste from the ceramic industry is present in an amount of 10-30% by weight and the aluminium silicate is present in an amount of 6-35% by weight.

7. The artificial stone panel or slab according to claim 1 further comprising additives selected from the group consisting of: dyes, pigments, antimicrobial additives, coupling agents, ultraviolet filters, accelerants and catalysts.

8. Method for manufacturing the artificial stone panel or slab of claim 1, comprising a phase of grinding the materials forming the filler, another phase containing the agglutinating agent with the catalyst and optionally other additives, mixing said phases until homogenizing the materials with the agglutinating agent, a phase of molding and compacting pulp obtained by vacuum vibro-compression, and a phase of hardening by polymerization of the agglutinating agent by means of heating, ending with a phase of cooling and polishing, wherein the polyester resin is made by previously mixing a polyol of a petrochemical origin together with a polyol of plant origin.

9. The artificial stone panel or slab according to claim 1, wherein the agglomerate comprises 7% to 13% by weight of the agglutinating agent with respect to the total weight of the agglomerate.

* * * * *